United States Patent [19]
Faulk

[11] Patent Number: 5,459,652
[45] Date of Patent: Oct. 17, 1995

[54] BOOT STRAP CIRCUIT FOR POWER UP CONTROL OF POWER SUPPLIES

[75] Inventor: Richard A. Faulk, Cypress, Tex.

[73] Assignee: Compaq Computer Corp., Houston, Tex.

[21] Appl. No.: 188,108

[22] Filed: Jan. 28, 1994

[51] Int. Cl.⁶ ................................................. H02M 3/335
[52] U.S. Cl. .............................. 363/49; 363/21; 363/41; 363/97; 323/901
[58] Field of Search ............................. 363/20, 21, 41, 363/49, 131, 141, 95, 97; 323/907, 901

[56] References Cited

U.S. PATENT DOCUMENTS

| | | | |
|---|---|---|---|
| 4,063,307 | 12/1977 | Stephens | 363/21 |
| 4,866,590 | 9/1989 | Odaka et al. | 363/49 |
| 5,014,178 | 5/1991 | Balakrishnan | 363/49 |
| 5,124,630 | 6/1992 | Tsutsumi | 323/299 |
| 5,350,997 | 9/1994 | Ghotbi et al. | 323/268 |

Primary Examiner—Peter S. Wong
Assistant Examiner—Shawn Riley
Attorney, Agent, or Firm—Pravel, Hewitt, Kimball & Krieger

[57] ABSTRACT

A boot strap control circuit including a depletion mode NMOS transistor to effectively switch a boot strap bleed resistor out of the circuit after power up is achieved. The NMOS transistor is initially turned fully on to allow current to flow through the bleed resistor to a pulse width modulation circuit (PWM) upon power up and to allow early control by the PWM. When the PWM reaches operating power, it asserts its reference voltage output high, activating a transistor switch to turn the NMOS transistor fully off. A capacitor maintains power to the PWM until an auxiliary winding of the power transformer develops sufficient voltage to operate the PWM. In the event of failure of the auxiliary winding, the NMOS transistor operates discretely, turning on and off at a low duty cycle, rather than operating in the linear mode. In this manner, the NMOS transistor and bleed resistor assure low power during normal operation and safe operation at all times.

7 Claims, 3 Drawing Sheets

5,459,652

BOOT STRAP CIRCUIT FOR POWER UP CONTROL OF POWER SUPPLIES

BACKGROUND OF THE INVENTION

1. Field of the Invention

The present invention relates to a boot strap circuit to supply energy for initial start up of a power supply.

2. Description of the Related Art

Switched mode power supplies are common for providing power to electronic devices, such as computer systems. In a switched mode power supply, AC power from a wall outlet is filtered and rectified to provide an unregulated DC input voltage. A control circuit controls the power supply by constantly switching current through the primary of a power transformer to transfer power to an output circuit. The output circuit develops the appropriate DC voltage levels for the electronic device. The primary switch preferably comprises a metal-oxide-semiconductor field-effect-transistor (MOSFET) as known to those skilled in the art. Several topologies and modes are commonly used, such as a flyback or a forward converter, which may operate at either constant or variable frequency depending upon the design specifications and needs of the electronic device. The present invention is contemplated for all types of switched mode power supplies.

During the initial power up cycle when the power supply is plugged in or turned on, the system is momentarily in a transient state, since a plurality of voltage and current transients are prevalent in the primary of the power supply. Designers must be aware of all potential transient conditions at power up and establish control of the power supply as soon as possible to prevent hazardous conditions or catastrophic failures. The control circuitry for the power supply monitors power supply operation and regulates performance by switching, shaping and transforming currents and voltages, which may, very quickly, become destructive and hazardous if not precisely monitored and manipulated. Because of this requirement, it is necessary to provide power and establish the initial state of the PWM as early as possible.

The control circuitry must initially derive its power from the primary portion of the power supply to meet isolation requirements between the primary and secondary portions of the power supply for safety purposes. An auxiliary or tertiary winding on the power transformer is usually provided for ultimately powering the control circuitry.. However, the auxiliary winding is unable to provide power immediately, since current through the auxiliary winding is controlled by the control circuitry. To solve this dilemma, a power up or "boot strap" circuit is commonly used to provide the initial power to the control circuitry from the DC input voltage source. Once powered, the control circuitry manipulates the primary switch to allow current flow through the primary and auxiliary inductances, where the auxiliary winding eventually provides the stable and efficient operating power for the control circuitry. Thus, the auxiliary winding eventually takes over providing power to the control circuitry once normal operation is established.

The simplest version of a boot strap circuit is a bleed resistor coupled between the DC input voltage and the VCC input of the control circuitry. The DC input voltage rises almost immediately upon power up, so that the current through the bleeder resistor provides the necessary power to the control circuitry relatively quickly. The resistance of the bleed resistor must be small enough to allow sufficient current to the control circuitry for early control. If the bleeder resistor is too large, it may take too long to power up the control circuitry. However, designers usually attempt to use as large a bleed resistor as practical. First, the bleed resistor must not allow too much current to the control circuitry causing failure. More importantly, once normal operation is achieved, the bleed resistor continues to draw substantial current and absorb significant amount of energy. In fact, it is common that a bleed resistor continually absorbs between several hundreds of milliwatts to as much as several watts in some designs. Most of this energy is converted to heat, which is very undesirable. This extra heat is unwelcome since the power supply must convert the same amount of power in a smaller, lighter package, and thus must dissipate heat at an increased rate. Nevertheless, the bleed resistor was a simple and cheap way to achieve the necessary boot strap control, particularly in common applications that already incorporated cooling fans or other heat extraction methods. The bleed resistor also provides a current limit to the control circuitry in the case of unexpected failure of the auxiliary winding.

With the advent of the Energy Star ratings issued by the Environmental Protection. Agency (EPA), it is becoming increasingly desirable to improve the efficiency of power supplies. Designers are continuously attempting to squeeze more power out of physically smaller power supply devices. Thus, designers are always looking for techniques to increase the efficiency of the power supply without substantially increasing the cost or the size of the power supply. Since the bleed resistor causes a substantial power loss, it is desirable to remove it. Nonetheless, boot strap control is vital to achieve safe operation and to prevent a hazardous situation or catastrophic failure.

An alternative to a bleed resistor is the use of a linear preregulator. The UCC 1883 micropower peak current mode controller device manufactured by Unitrode is an example of a device that incorporates a linear regulator. This product combines main power supply control and regulation circuits into one device. Such devices are common in the industry and are quite diverse in their specific design and function. These devices, however, are commonly used and are typically referred to as pulse width modulators (PWMs). The UCC 1883 device is used in conjunction with an N-type depletion-mode pass MOSFET (NMOS), such as the BSS129. The UCC 1883 device, the depletion mode NMOS transistor and various other miscellaneous components are configured to establish a 9.5 volt linear preregulator to supply input voltage to the UCC 1883 PWM from the DC input voltage. The current path of the NMOS transistor is coupled directly between the DC input voltage and the VCC input of the PWM, and its control terminal receives an output from a control regulator provided within the UCC 1883 device. When the gate to source voltage of the NMOS transistor is zero, a low resistance current path is provided between its drain and source. Thus, the NMOS transistor allows current to flow from the DC input voltage to the PWM almost immediately upon power up.

The drain to source current path of the NMOS transistor is effectively turned off when a negative voltage is applied between its gate to source. The UCC 1883 includes an internal voltage reference and a circuit to regulate the VCC input at approximately 9.5 volts by controlling the gate pin of the NMOS transistor. The regulator operates the NMOS transistor in a linear mode until the auxiliary winding develops the appropriate regulation voltage for providing power to the PWM. The auxiliary winding eventually establishes an appropriate, higher voltage than the 9.5 reference so that the internal regulator turns off the NMOS transistor. Thereafter, the NMOS transistor isolates the DC input voltage from the PWM. In this manner, boot strap power is provided at power up and terminated during normal operation. The use of the bleed resistor is not required and efficiency is improved.

It has been discovered, however, that there are several disadvantages in using the UCC 1883 device. First, the UCC 1883 device is useful for some designs, but is not appropriate for all designs. Furthermore, the UCC 1883 device is more expensive than most PWM devices on the market. This may primarily be due to the fact that the UCC 1883 is a specialized part, requiring an extra internal voltage reference and regulator and a separate output pin to achieve the boot strap control. Thus, the added cost and limited capability of the UCC 1883 limits its use for most switching mode power supply applications.

Another primary draw back to the UCC 1883 device is a potential safety hazard. The NMOS transistor illustrated by Unitrode, such as the BSS129, is used to supply power only during initial power up, but eventually shuts down after the auxiliary winding takes over. However, if the auxiliary winding should fail or if its voltage should drop below the 9.5 volt regulation point for any reason, the internal regulator of the UCC 1883 device activates the NMOS transistor and operates it in the linear mode to regulate VCC at 9.5 volts. This situation is clearly not desired. Almost the entire DC input voltage is placed across the NMOS transistor, which typically has a limited voltage rating. Since the NMOS transistor is operated in its linear mode, it represents a resistance and consumes a considerable amount of power, generating substantial heat. Furthermore, the PWM is potentially exposed to the extremely high voltages of the DC input voltage if the NMOS transistor breaks down due to the high power dissipation.

Therefore, it is desirable to provide a low cost and efficient boot strap circuit for use in almost all switching power supplies, while also maintaining desired safety features in case of unexpected failure.

SUMMARY OF THE PRESENT INVENTION

A boot strap control circuit according to the present invention includes a depletion mode NMOS transistor and a circuit to effectively switch a bleed resistor out of the circuit when normal operation is achieved. The NMOS transistor is operated in a discrete or digital mode, where it is either turned fully on or fully off and is not operated in the active region. When turned on, the NMOS transistor allows the DC input to provide the initial power through the bleed resistor to the PWM and to charge a capacitor. When the power capacitor voltage is achieved, the PWM asserts its reference voltage output high and begins oscillating. The NMOS transistor is turned off in response to the assertion of the reference voltage, which completely isolates the bleed resistor from the circuit, removing its inefficiency. The charged capacitor maintains power to the PWM while the auxiliary winding develops voltage.

A simple switching circuit switches the NMOS transistor in response to the reference voltage of a typical PWM device. When the PWM asserts its VREF output high, the switching circuit pulls the gate of the NMOS transistor low, switching it off. In this manner, an inexpensive and common PWM chip together with a simple transistor switch is all that is necessary to complete the circuit.

An added level of safety is also achieved. Should the auxiliary winding fail, the VCC voltage drops until the VREF signal is negated. The NMOS transistor is turned on so that current is once again provided from the DC input voltage through the bleed resistor. However, since the NMOS transistor is only allowed to be on or off, the PWM is periodically switched on and off at a relatively slow rate. There is no harm to the PWM or other circuitry, and the NMOS transistor consumes very little power. The bleed resistor prevents substantial current to the PWM and reduces the risk of catastrophic failure.

Therefore, a boot strap control circuit according to the present invention provides a low cost and efficient way to initially power up the PWM while also providing the desired safety features to reduce the risk of catastrophic failure.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
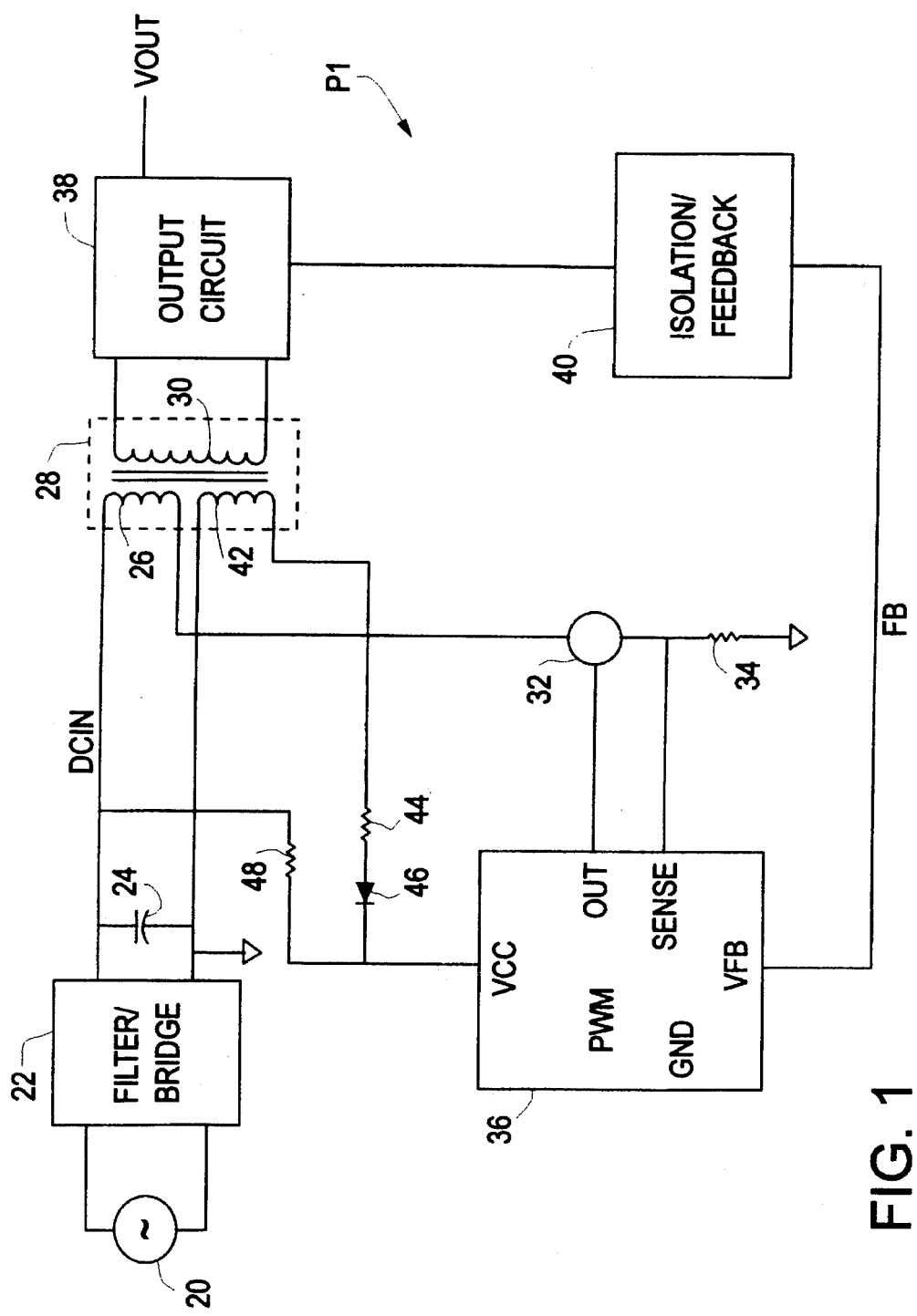
FIG. 1 is a simplified block schematic block diagram of a power supply using a bleed resistor according to prior art.

Referring now to FIG. 1, a simplified block schematic diagram is shown of a power supply P1 using a bleed resistor according to prior art. An AC source 20 is coupled to the input of a filter/bridge circuit 22. The filter/bridge circuit 22 preferably includes an EMI filter for preventing noise generated by the power supply P1 from being transmitted to the AC source 20 and a full wave bridge rectifier for converting AC voltage to DC voltage. The filter/bridge circuit 22 provides an unregulated DC voltage, referred to as a signal DCIN. The DCIN signal is filtered through a bulk capacitor 24 coupled to ground. The DCIN signal is provided to one end of a primary inductor 26 of a power transformer 28, which has a secondary inductor 30. The other end of the primary inductor 26 is coupled to one side of the current path of a primary switch 32, having its other side of its current path connected to one end of a current sense resistor 34. The other end of the resistor 34 is connected to ground.

A pulse width modulation (PWM) circuit 36 is the central control device of the power supply P1. The PWM 36 provides an output signal to the control terminal of the primary switch 32, which preferably comprises a metal oxide conductor field-effect-transistor (MOSFET) as known to those skilled in the art. The PWM 36 also receives a signal at its SENSE input from the junction between the primary switch 32 and the resistor 34. Briefly, the PWM 36 asserts its output to turn on the primary switch 32, allowing power to flow through the primary inductor 26. Power is transferred to the secondary inductor 30 through the transformer 28, either directly (forward mode) or indirectly (flyback mode), depending on the topology of the power supply P1. An output circuit 38 is coupled to the secondary inductor 30 for developing the necessary output voltage signals of the power supply P1 required for use by an electronic device. Although a single output signal referred to as VOUT is shown, several different outputs having various levels of voltage are common.

An isolation and feedback circuit 40 is coupled to the output circuit 38 and provides a feedback signal FB to the PWM 36. The PWM 36 senses the current through the primary inductor 26 at its SENSE input and also detects the FB signal. The PWM 36 negates its output turning off the primary switch 32 to interrupt current through the primary inductor 26 until the next cycle. Thus, the PWM 36 pulses its output signal continuously to transfer power from the primary to the secondary of the power supply P1.

The transformer 28 also preferably includes an auxiliary winding 42 having one end coupled to ground and the other end connected to one side of a resistor 44. The other side of the resistor 44 is connected to anode of a diode 46, having its cathode connected to the VCC input of the PWM 36. In this manner, the current flowing through the primary inductor 26 develops a voltage across the auxiliary inductor 42, which is current limited and rectified by the resistor 44 and the diode 46 to provide operation power to the PWM 36. However, when the power supply P1 is initially plugged in or turned on, the PWM 36 must receive power earlier than the auxiliary winding 42 can provide. It is noted that the PWM 36 must be powered before activating the primary switch 32, since otherwise the appropriate voltage can not develop across the auxiliary winding 42. Thus, a bleed resistor 48 is coupled between the DCIN signal and the VCC input of the PWM 36. In this manner, upon power up, the DCIN signal provides current to the PWM 36 through the resistor 48 to initially power up the PWM 36 for initialization. Once powered, PWM 36 begins controlling the primary switch 32 to begin normal operations.

Eventually, the auxiliary winding 42 provides power through the diode 46 to the PWM 36. It is noted, however, that the bleed resistor 48 continually draws current through the DCIN signal and thus constantly absorbs power and generates heat. In fact, since the DCIN signal is generally several hundreds of volts, the bleed resistor 48 is typically about 100Kohms and the PWM 36 operates at approximately 15 volts, the bleed resistor 48 may consume between several hundred milliwatts to 5 watts of power continuously while the power supply P1 is operating normally.

Figure 2:
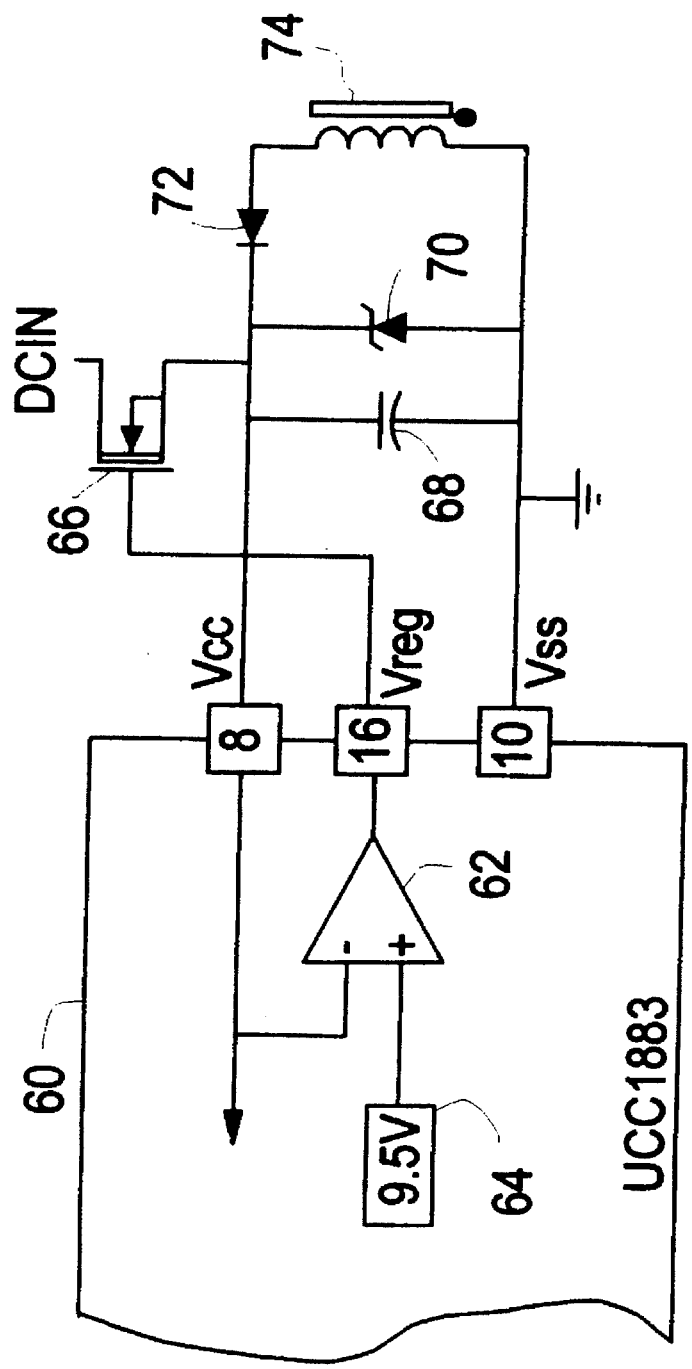
FIG. 2 is a schematic diagram illustrating a linear pre-regulator circuit according to prior art.

Referring now to FIG. 2, a schematic diagram is shown of a linear pre-regulator circuit according to prior art. In particular, a portion of a UCC 1883 micropower peak current mode controller (controller) 60 is shown, which includes an internal control amplifier 62 and an internal voltage reference generator 64. The VCC input of the controller 60 is provided to the negative input of the control amplifier 62, having its positive input receiving a reference voltage from an internal voltage regulator 64. The reference voltage of the voltage regulator 64 is preferably approximately 9.5 volts. The output of the control amplifier 62 is provided to the VREG output of the controller 60, which is coupled to the gate of an N-type depletion mode pass MOSFET (NMOS) 66, which is preferably the BSS129. The DCIN signal is coupled to the drain of the NMOS transistor 66, which has its source connected to the VCC input of the controller 60, to one end of a capacitor 68, to the cathode of a Zener diode 70 and to the cathode of a diode 72. The other side of the capacitor 68 and the anode of the Zener diode 70 are connected to ground. The .anode of the diode 72 is connected to one end of an auxiliary inductor 74, having its other end connected to ground. The auxiliary inductor 74 is similar to the auxiliary winding 42 of the power supply P1 and preferably operates in a similar manner. The Zener diode 70 preferably limits the VCC input voltage of the controller 60 to a maximum of 13 volts and the capacitor 68 filters the VCC input.

In operation, when the power supply P1 is plugged in or turned on, the DCIN signal begins to rise. The NMOS transistor 66 initially provides a low resistance current path between the DCIN signal through its drain to source directly to the VCC .input of the controller 60, to provide initial boot strap power to the controller 60. The Zener diode 70 limits the maximum voltage of the VCC input to approximately 13 volts. The controller 60 therefore receives power from the DCIN signal through the NMOS transistor 66 upon power up. Eventually, the VCC input develops the necessary operating voltage and the reference voltage output of the regulator 64 is asserted at 9.5 volts. The regulator 62 thereafter attempts to regulate the VCC input to 9.5 volts.

Subsequently, the controller 60 begins to operate and the auxiliary winding 74 soon develops an operating voltage, rectified through the diode 72, which is provided power to the VCC input of the controller 60. The auxiliary winding 74 forces the VCC input to a higher voltage than the regulation voltage of the regulator 62.

Thus, the regulator 62 turns the NMOS transistor 66 off, isolating the DCIN signal from the VCC input of the controller 60. It is noted that if the auxiliary winding 74 should fail or should otherwise output a low voltage for a variety of reasons, the VCC input voltage of the controller 60 begins to drop, turning on the control amplifier 62 and thus turning on the NMOS transistor 66. Once again, the DCIN signal is provided to the VCC input of the controller 60 as controlled by the control amplifier 62. In this manner, control amplifier 62 regulates the NMOS transistor 66 in the linear range essentially regulating the VCC input to approximately 9.5 volts.

Regulation of the VCC input by operating the NMOS transistor 66 in the linear mode is undesirable for several reasons. The NMOS transistor 66 has a maximum voltage rating of approximately 250 volts, and could fail if operated in the linear mode while the DCIN signal is several hundred volts or more. Thus, the BSS129 could only be used for domestic designs, where the voltage should not exceed 200 volts. If the NMOS transistor 66 fails, it could be catastrophic, possibly causing injury. If it fails to a short circuit, the controller 60 would be directly exposed to the excessive voltage level of the DCIN signal, also raising the risk of catastrophic failure.

Figure 3:
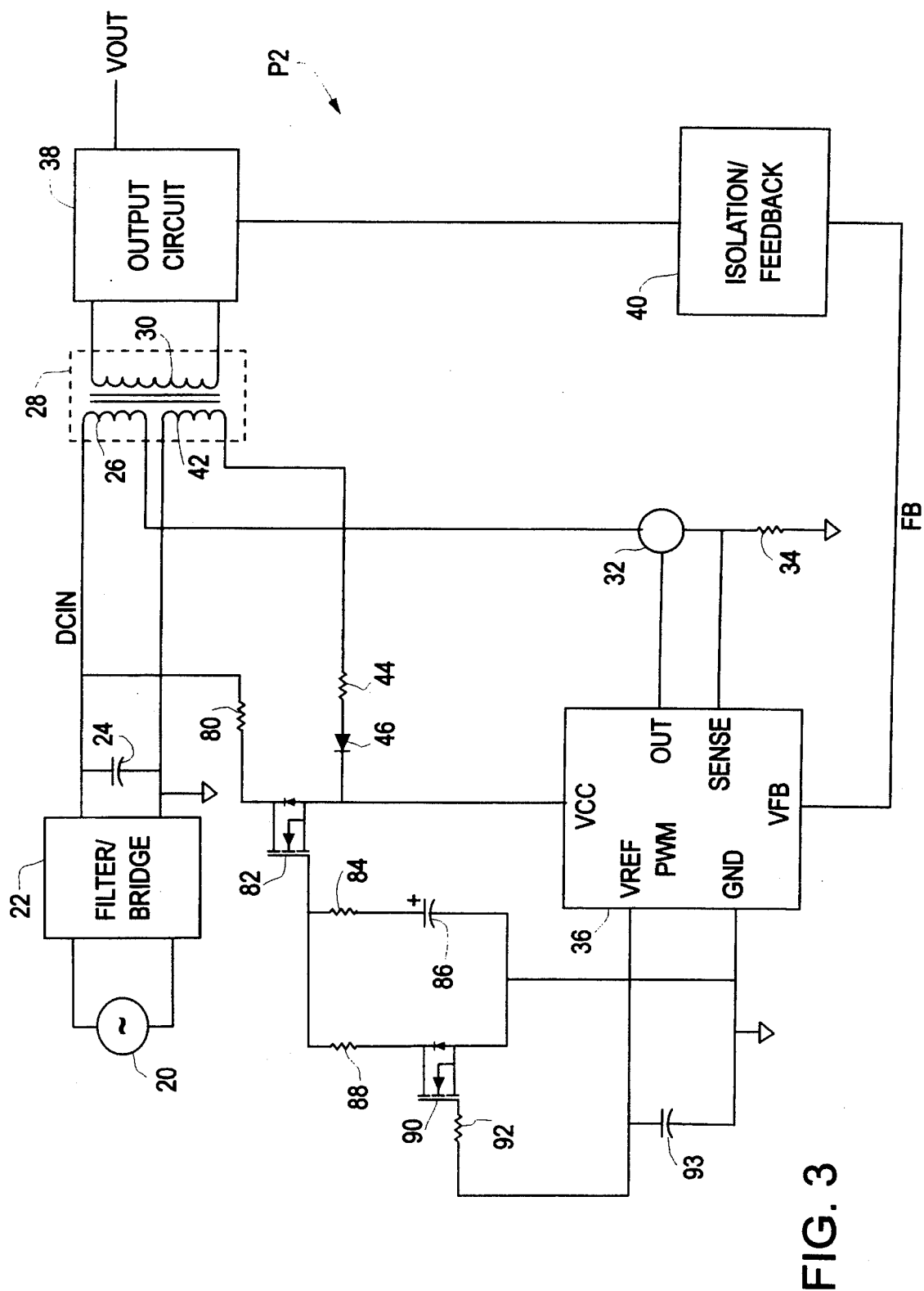
FIG. 3 is a simplified block diagram of a power supply incorporating a boot strap control circuit according to the present invention.

Referring now to FIG. 3, a simplified schematic diagram is shown of a power supply P2 including a boot strap control circuit according to the present invention. The power supply P2 is similar to the power supply P1 and includes several similar components retaining identical reference numerals. Essentially, the AC source 20, the filter/bridge circuit 22, the transformer 28, the output circuit 38, the PWM 36, the primary switch 32, the sense resistor 34 and the isolation feedback circuit 40 .operate in a very similar manner in the power supply P2 as described for the power supply P1. However, a bleed resistor 80 is also included, having one end connected to the DCIN signal and its other end connected to the drain of an N-type depletion-mode MOSFET (NMOS) 82. The bleed resistor 80 preferably has a resistance of approximately 100 Kohms, and may also comprise several resistors in series. The NMOS transistor 82 is preferably the LND150N8 manufactured by Supertex. The LND150N8 NMOS transistor is preferred since it has a high voltage rating of about 400 volts, and thus is suitable for domestic and international power supply designs.

The source of the NMOS transistor 82 is connected to the VCC input of the PWM 36, to one side of a resistor 84 and one side of a capacitor 86. The other side of the capacitor 86 is connected to ground and the other side of the resistor 84 is connected to the gate of the NMOS transistor 82 and to one side of a resistor 88. The other side of the resistor 88 is connected to the drain of an N-channel MOSFET 90, having its source connected to ground and its gate connected to one side of a resistor 92. The other side of the resistor 92 is connected to the VREF output of the PWM 36. The VREF output of the PWM 39 is filtered by a capacitor 93.

In operation, when the power supply P2 is initially plugged in or turned on, the DCIN signal begins to rise rapidly. The NMOS transistor 82 initially provides a current path through its drain and source and through the resistor 80 from the DCIN signal to the VCC input of the PWM 36. Thus, the bleed resistor 80 operates in a similar manner as the bleed resistor 48 during power up. The resistor 84 maintains the voltage across the gate to source approximately equal to that needed to keep the NMOS transistor 82 on. While the PWM 36 is receiving current through the bleed resistor 80, the capacitor 86 also charges to the same voltage level as the VCC input. Current requirements of the PWM 36 are extremely low at this point.

Eventually, the voltage at the VCC input reaches the start-up operating voltage for the PWM 36, which is preferably approximately 15 volts. At this time, the VREF output is asserted high and the PWM 36 begins oscillating in its normal fashion. As soon as the VREF signal is asserted high, the MOSFET 90 is turned on, pulling the gate of the NMOS transistor 82 to a low voltage level. Since the capacitor 86 maintains the source of the NMOS transistor 82 high, the NMOS transistor 82 is turned off. This isolates the bleed resistor 80 from the circuit. While the PWM 36 is oscillating, a voltage is developed across the auxiliary winding 42 to eventually provide the necessary operating voltage at the VCC input of the PWM 36. In the interim, however, the voltage across the capacitor 86 provides operating power for the PWM 36 while the NMOS transistor 82 is off and the auxiliary winding 42 has not yet achieved the operating voltage. The voltage of the capacitor 86 is therefore decreasing as the PWM 36 operates from its stored energy. Eventually, the auxiliary winding 42 develops the appropriate voltage to operate the PWM 36 through the resistor 44 and diode 46.

Due to the built-in hysteresis of common PWMs, such as the PWM 36, the voltage at the VCC input may sag appreciably before the PWM 36 is shut down. In the preferred embodiment, the voltage at the VCC input may drop to as low as 8 volts before the PWM 36 is turned off. During the entire operating voltage range of 8 to 15 volts, the NMOS transistor 82 remains off so that the PWM 36 is powered entirely through the auxiliary winding 42. In this manner, the bleed resistor 80 and the NMOS transistor 82 do not consume any appreciable power, increasing the overall efficiency of the power supply P2.

If the voltage across the auxiliary winding 42 should decrease to below its minimum operating voltage level, the PWM 36 shuts down, and the VREF signal is negated. The NMOS transistor 82 is again turned on to allow current to flow through the bleed resistor 80. Eventually, the voltage at the VCC input of the PWM 36 rises to the start up voltage for the PWM 36, turning it on. If the auxiliary winding 42 fails or is defective, so that it never develops the appropriate voltage, the PWM 36 turns on and off at a relatively slow rate. In particular, the PWM 36 will remain on for just tenths of a second and then turn off for a few seconds. Since the NMOS transistor 82 is not operating linearly, but is operating in a discrete manner, being switched on or off, it does not draw appreciable power. The bleed resistor 80 prevents a substantial amount of current to reduce the risk of hazardous condition or catastrophic failure. Also, since the on duty cycle is relatively small, it dissipates a safe amount of power during this cycling operation.

It can now be appreciated that the boot strap control circuit according to the present invention provides a substantial advantage over prior boot strap designs. First, a bleed resistor is initially used but removed by a depletion mode NMOS transistor once the PWM 36 is powered up. The NMOS transistor is operated in a discrete manner, so that it is either fully on or fully off and does not operate in the linear or active region. Therefore, neither the NMOS transistor nor the bleed resistor absorb a substantial amount of power.

If a failure should occur causing a low voltage condition of the auxiliary winding, the NMOS transistor turns on and off at a very low duty cycle, but does not operate in the active region. Therefore, neither the NMOS transistor nor the bleed resistor consumes appreciable amount of power. The bleed resistor also prevents a substantial current draw during an unexpected failure, thereby substantially reducing the risk of catastrophic failure. Finally, a common, off-the-shelf PWM is used avoiding the use of a more expensive and specialized controller chip to implement boot strap. Thus, a boot strap control circuit according to the present invention provides a low cost and efficient method of providing power to the PWM during power up, while achieving an additional level of safety in the event of unexpected failure.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A boot strap control circuit for providing initial power from a DC input signal to the power input of a pulse width modulation circuit of a switching power supply, wherein the pulse width modulation circuit includes an output for asserting a reference voltage after receiving sufficient operating voltage, said boot strap control circuit comprising:

a bleed resistor for coupling in series between the DC input signal and the power input of the pulse width modulation circuit, said bleed resistor having a resistance to allow sufficient current from the DC input signal to power the pulse width modulation circuit;

a current pass device having a control terminal and having a current path for coupling in series between said bleed resistor and the power input of the pulse width modulation circuit, wherein said current pass device allows current to flow through said bleed resistor to the pulse width modulation circuit when the voltage of said control terminal is greater than or equal to the voltage of said current path, and does not allow such current flow when the voltage of said control terminal is less than the voltage of said current path;

a capacitor for coupling between the power input of the pulse width modulation circuit and ground; and a switch coupled between said control terminal of said current pass device and ground and for receiving the reference voltage from the pulse width modulation circuit, wherein said switch is off, thereby turning said current pass device on, while the reference voltage is not asserted, and wherein said switch is turned on, thereby turning off said current pass device, when the reference voltage is asserted.

2. The boot strap control circuit of claim 1, wherein said current pass device comprises an N-type depletion-mode MOSFET.

3. The boot strap control circuit of claim 2, further comprising:

a resistor coupled between the gate and source of said N-type depletion-mode MOSFET.

4. The boot strap control circuit of claim 1, wherein said switch comprises a MOSFET transistor.

5. The boot strap control circuit of claim 1, wherein the power supply includes an auxiliary circuit coupled to the power input of the pulse width modulation circuit for supplying power to the pulse width modulation circuit after it begins operating.

6. The boot strap control circuit of claim 5, wherein the switching power supply includes a power transformer and wherein said auxiliary circuit includes an auxiliary winding provided on said power transformer.

7. The boot strap control circuit of claim 6, wherein said bleed resistor has a resistance of approximately 100 Kohms.

* * * * *